UNITED STATES PATENT OFFICE.

JOAQUIN CRESPO, OF MEXICO, MEXICO.

COMPOSITION OF MATTER FOR IMPREGNATING ARTICLES MADE OF PAPER, PASTEBOARD, PULP, AND SIMILAR MATERIAL.

1,401,524.

Specification of Letters Patent.

Patented Dec. 27, 1921.

No Drawing. Application filed June 29, 1921. Serial No. 481,370.

*To all whom it may concern:*

Be it known that I, JOAQUIN CRESPO, a subject of the King of Spain, and a resident of Mexico City, Mexico, have invented a certain new and useful Composition of Matter for Impregnating Articles Made of Paper, Pasteboard, Pulp, and Similar Material, of which the following is a specification.

My invention refers to a new composition of matter for impregnating all kinds of articles made of paper, pasteboard, cardboard, pulp and similar materials, and has for its object to provide an impregnating composition by which said articles are hardened and made impermeable and waterproof to such an extent that their life and durability will be greatly increased. It is a special object of this invention to provide an impregnating composition or solution by which the bobbins and spools used in weaving machines and made of paper, pasteboard or similar material, may be hardened and made impermeable in order to increase their resistance and durability.

The composition referred to above consists of the following ingredients combined approximately in the proportions by weight indicated hereinafter:

| | |
|---|---|
| Colophony (rosin) | 15,000 parts. |
| Stearin | 1,500 parts. |
| Paraffin | 1,500 parts. |
| Sulfur | 100 parts. |

These ingredients are all mixed together and melted over a suitable source of heat.

For applying this composition, it is first reduced to a liquid or melted state, and then the articles to be impregnated are completely immersed in it; the articles to be preferably treated in this manner, are tubes, bobbins and spools made of paper, pulp, pasteboard or similar material, as also any other kind of articles made of the same material or its derivates, where their hardness, impermeability and resistance to atmospheric influences are the main objects.

I know that different kinds of oil and resins have been used for producing impermeability, and also that paraffin has been used with the same object in view, but I do not know and believe that all the ingredients of my composition have ever been used together and especially for my object.

It is obvious that the proportions given above for mixing the ingredients of this composition may vary to a certain extent according to the articles to be treated and according to the use to which said articles are destined.

Claim.

An impregnating composition for paper and the like, consisting of rosin 15000 parts, stearin 1500 parts, paraffin 1500 parts, and sulfur 100 parts, substantially as specified.

In testimony whereof I affix my signature in presence of two witnesses.

JOAQUIN CRESPO.

Witnesses:
MANUEL CRESPO,
J. LONG.